(12) United States Patent
Yu et al.

(10) Patent No.: US 10,988,135 B2
(45) Date of Patent: Apr. 27, 2021

(54) METHODS TO DETECT LATERAL CONTROL OSCILLATIONS IN VEHICLE BEHAVIOR

(71) Applicant: GM GLOBAL TECHNOLOGY OPERATIONS LLC, Detroit, MI (US)

(72) Inventors: Bo Yu, Novi, MI (US); Donald G. Wirkner, Dexter, MI (US); Heng Zhou, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 254 days.

(21) Appl. No.: 16/202,673

(22) Filed: Nov. 28, 2018

(65) Prior Publication Data

US 2020/0164867 A1 May 28, 2020

(51) Int. Cl.
*B60W 30/02* (2012.01)
*G05D 1/00* (2006.01)

(52) U.S. Cl.
CPC ........... *B60W 30/02* (2013.01); *G05D 1/0088* (2013.01); *B60W 2520/125* (2013.01); *B60W 2520/14* (2013.01); *B60W 2710/10* (2013.01); *B60W 2710/18* (2013.01); *B60W 2710/20* (2013.01); *B60W 2720/106* (2013.01); *B60W 2900/00* (2013.01)

(58) Field of Classification Search
CPC ............................ B60W 30/02; G05D 1/0088
See application file for complete search history.

(56) References Cited

U.S. PATENT DOCUMENTS

| 2013/0030665 A1* | 1/2013 | Nishio | B60W 10/184 701/70 |
| 2017/0246955 A1* | 8/2017 | Richards | B60W 10/184 |

\* cited by examiner

*Primary Examiner* — Jess Whittington
(74) *Attorney, Agent, or Firm* — Quinn IP Law

(57) ABSTRACT

An exemplary method for detecting a lateral oscillation of a vehicle includes monitoring yaw rate data and lateral acceleration data of the vehicle, analyzing the yaw rate and lateral acceleration data to generate a yaw rate signal energy distribution and a lateral acceleration signal energy distribution, determining whether a series of conditions are satisfied; and if the conditions are satisfied, automatically controlling the actuator to reduce the lateral oscillation of the vehicle. In some examples, the series of conditions includes the detection of spikes in the yaw rate and lateral acceleration data at approximately the same frequency, a magnitude of the spikes exceeding a first threshold, and a phase shift between the yaw rate and lateral acceleration data exceeding a second threshold.

17 Claims, 3 Drawing Sheets

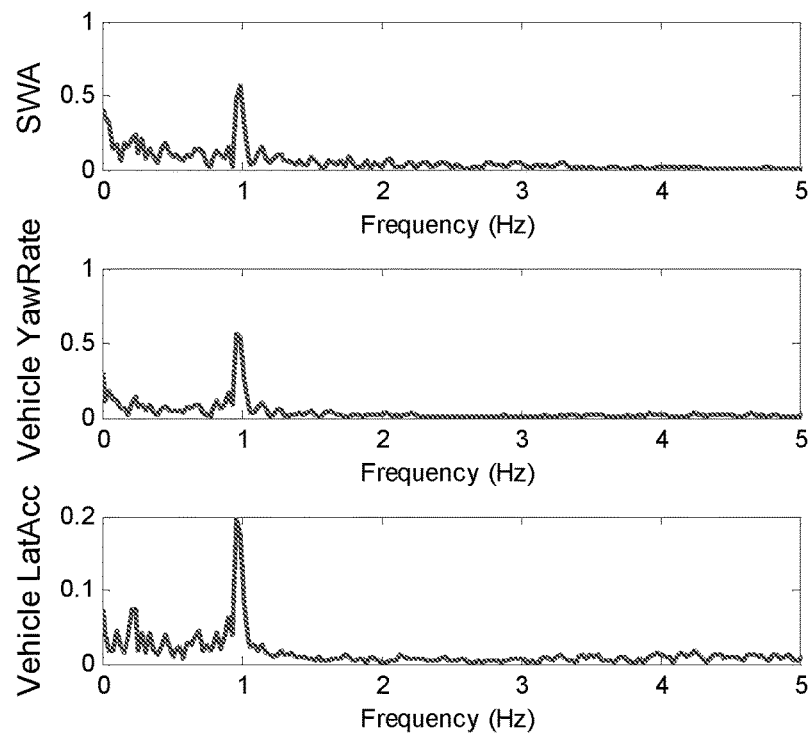
FIG. 3
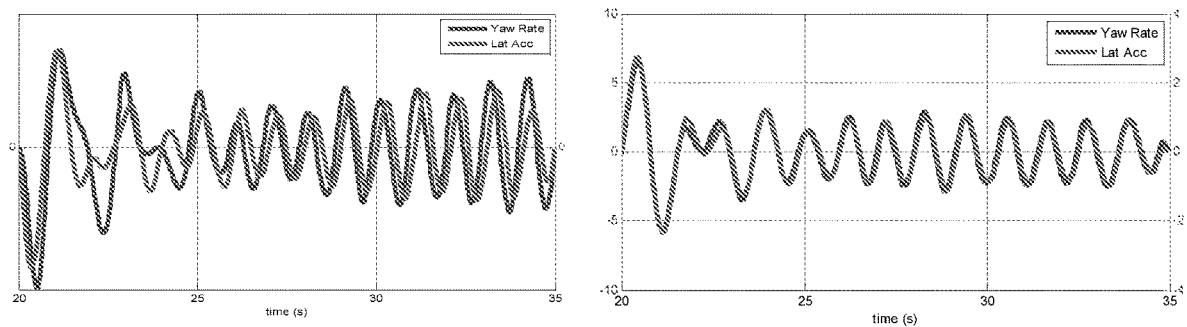
FIG. 4
FIG. 5

METHODS TO DETECT LATERAL CONTROL OSCILLATIONS IN VEHICLE BEHAVIOR

INTRODUCTION

The present invention relates generally to the field of vehicles and, more specifically, to vehicle steering systems and methods for the detection of lateral control oscillations of a vehicle.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous and semi-autonomous vehicles may include a steer-by-wire steering system to enable the operator to maneuver or steer the vehicle. A steer-by-wire steering system establishes steering control through electric motors that are controlled by algorithms stored in one or more electronic control units (ECUs).

For vehicles towing a trailer, external force oscillations may be due to trailer sway, including, for example, incorrect weight distribution of the trailer or high tow vehicle speed, wind, road conditions, or other environmental or operating conditions. During operation in an autonomous or semi-autonomous mode, the oscillations may result in a reduction in lateral control of the vehicle.

SUMMARY

Embodiments according to the present disclosure provide a number of advantages. For example, embodiments according to the present disclosure enable detection of lateral oscillations of a vehicle using vehicle sensor data and signal processing to improve vehicle lateral control, specifically during autonomous or semi-autonomous operation.

In one aspect, a method for detecting a lateral oscillation of a vehicle includes providing a vehicle control system. In some aspects, the vehicle control system includes a first sensor configured to measure a yaw rate of the vehicle, a second sensor configured to measure a lateral acceleration of the vehicle, an actuator configured to control a vehicle operating condition, and a controller electronically connected to the first and second sensors and the actuator. The method further includes the steps of monitoring, by the controller, yaw rate data received from the first sensor and lateral acceleration data received from the second sensor, analyzing, by the controller, the yaw rate and lateral acceleration data to generate a yaw rate signal energy distribution and a lateral acceleration signal energy distribution, and determining, by the controller, whether a first condition is satisfied. If the first condition is satisfied, the method includes determining, by the controller, whether a second condition is satisfied, and if both of the first and second conditions are satisfied, the method includes determining, by the controller, whether a third condition is satisfied. If the third condition is satisfied, the method includes automatically controlling, by the controller, the actuator to reduce the lateral oscillation of the vehicle.

In some aspects, the first and second sensors are components of an inertial measurement unit of the vehicle.

In some aspects, the controller includes an automated driving system to control the vehicle via the actuator.

In some aspects, analyzing the yaw rate and lateral acceleration data includes applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies.

In some aspects, analyzing the yaw rate and lateral acceleration signal energy distributions at the plurality of predetermined frequencies includes calculating an amplitude and phase of the yaw rate signal energy distribution at each of the plurality of predetermined frequencies and calculating an amplitude and phase of the lateral acceleration signal energy distribution at each of the plurality of predetermined frequencies.

In some aspects, the first condition is whether a first spike is present in the yaw rate signal energy distribution at a first predetermined frequency and a second spike is present in the lateral acceleration signal energy distribution at the first predetermined frequency.

In some aspects, the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold.

In some aspects, the third condition is whether a phase shift between the yaw rate signal energy distribution and the lateral acceleration signal energy distribution is greater than a third predetermined threshold.

In some aspects, automatically controlling the actuator to reduce the lateral oscillation of the vehicle includes generating a control signal to control one or more of a steering, shifting, throttle, and braking operation of the vehicle.

In another aspect, an automotive vehicle includes a vehicle control system. The vehicle control system includes a first sensor configured to measure a yaw rate of the vehicle, a second sensor configured to measure a lateral acceleration of the vehicle, an actuator configured to control a vehicle operating condition; and a controller electronically connected to the first and second sensors and the actuator. In some aspects, the controller is configured to monitor yaw rate data received from the first sensor and lateral acceleration data received from the second sensor, analyze the yaw rate and lateral acceleration data to generate a yaw rate signal energy distribution and a lateral acceleration signal energy distribution, and determine whether a first condition is satisfied. If the first condition is satisfied, the controller determines whether a second condition is satisfied and if both of the first and second conditions are satisfied, determines whether a third condition is satisfied. If the third condition is satisfied, the controller automatically controls the actuator to reduce a lateral oscillation of the vehicle. In some aspects, the first condition is whether a first spike is present in the yaw rate signal energy distribution at a first frequency and a second spike is present in the lateral acceleration signal energy distribution at the first frequency, the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold, and the third condition is whether a phase shift between the yaw rate signal energy distribution and the lateral acceleration signal energy distribution is greater than a third predetermined threshold.

In some aspects, analyzing the yaw rate and lateral acceleration data includes applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies.

In some aspects, analyzing the yaw rate and lateral acceleration signal energy distributions at the plurality of predetermined frequencies includes calculating an amplitude and phase of the yaw rate signal energy distribution at each of the plurality of predetermined frequencies and calculating an amplitude and phase of the lateral acceleration signal energy distribution at each of the plurality of predetermined frequencies.

In some aspects, the automotive vehicle further includes an inertial measurement unit electronically connected to the controller and the first and second sensors are components of the inertial measurement unit of the vehicle.

In some aspects, automatically controlling the actuator to reduce the lateral oscillation of the vehicle includes generating a control signal to control one or more of a steering, shifting, throttle, and braking operation of the automotive vehicle.

In yet another aspect, a system for controlling a vehicle includes a first sensor configured to measure a yaw rate of the vehicle, a second sensor configured to measure a lateral acceleration of the vehicle, an actuator configured to control a vehicle operating condition, and a controller electronically connected to the first and second sensors and the actuator. In some aspects, the controller is configured to monitor yaw rate data received from the first sensor and lateral acceleration data received from the second sensor, analyze the yaw rate and lateral acceleration data to generate a yaw rate signal energy distribution and a lateral acceleration signal energy distribution, and determine whether a first condition is satisfied. If the first condition is satisfied, the controller determines whether a second condition is satisfied and if both of the first and second conditions are satisfied, determines whether a third condition is satisfied, and if the third condition is satisfied, automatically controls the actuator to reduce the lateral oscillation of the vehicle. In some aspects, the first condition is whether a first spike is present in the yaw rate signal energy distribution at a first frequency and a second spike is present in the lateral acceleration signal energy distribution at the first frequency, the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold, and the third condition is whether a phase shift between the yaw rate signal energy distribution and the lateral acceleration signal energy distribution is greater than a third predetermined threshold.

In some aspects, analyzing the yaw rate and lateral acceleration data includes applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies.

In some aspects, analyzing the yaw rate and lateral acceleration signal energy distributions at the plurality of predetermined frequencies includes calculating an amplitude and phase of the yaw rate signal energy distribution at each of the plurality of predetermined frequencies and calculating an amplitude and phase of the lateral acceleration signal energy distribution at each of the plurality of predetermined frequencies.

In some aspects, automatically controlling the actuator to reduce the lateral oscillation of the vehicle includes generating a control signal to control one or more of a steering, shifting, throttle, and braking operation of the vehicle.

BRIEF DESCRIPTION OF THE DRAWINGS

The present disclosure will be described in conjunction with the following figures, wherein like numerals denote like elements.

FIG. 3 is a graphical representation of a spike observed in steering wheel angle, yaw rate, and lateral acceleration data for a vehicle, according to an embodiment.

FIG. 4 is a graphical representation of a phase shift between yaw rate and lateral acceleration data for a vehicle indicating poor lateral control of a vehicle, according to an embodiment.

FIG. 5 is a graphical representation of a phase shift between yaw rate and lateral acceleration data for a vehicle indicating acceptable lateral control of a vehicle, according to an embodiment.

Figure 1:
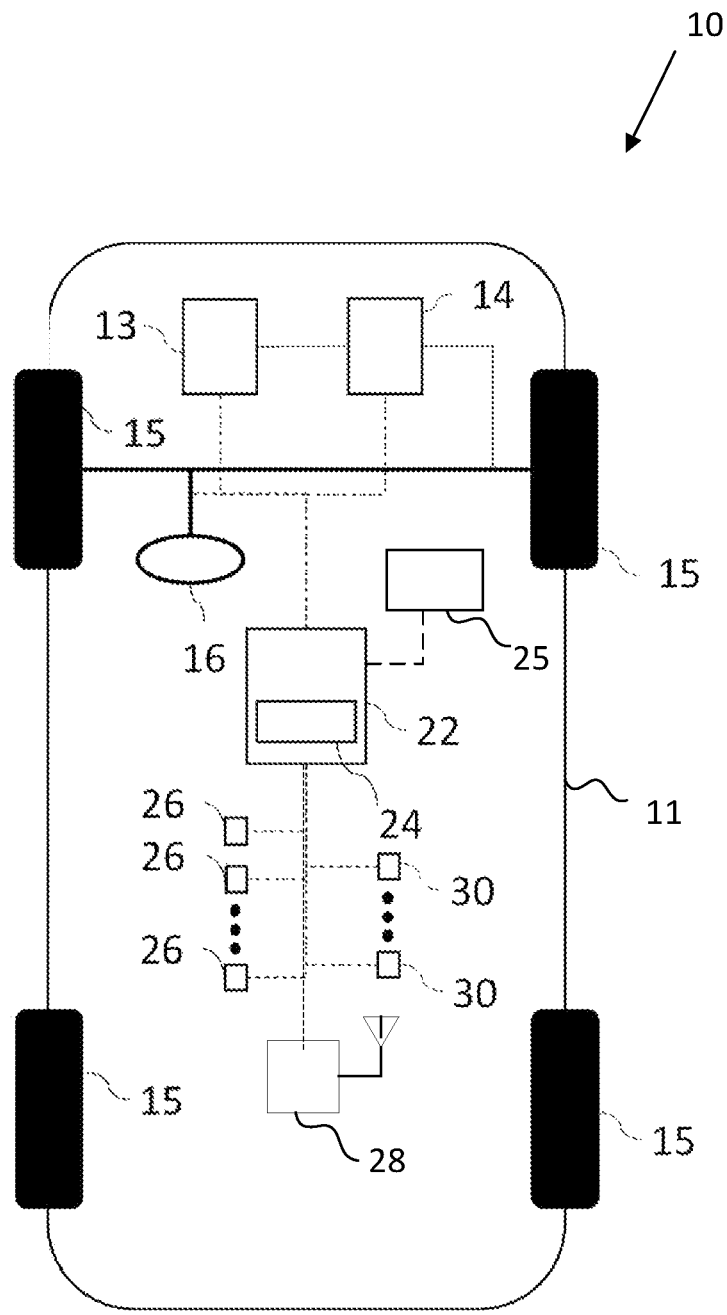
FIG. 1 is a schematic diagram of a vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission. The vehicle 10 additionally includes wheel brakes (not shown) configured to provide braking torque to the vehicle wheels 15. The wheel brakes may, in various embodiments, include friction brakes, a regenerative braking system such as an electric machine, and/or other appropriate braking systems. The vehicle 10 additionally includes a steering system 16. While depicted as including a steering wheel and steering column for illustrative purposes, in some embodiments, the steering system 16 may not include a steering wheel.

In various embodiments, the vehicle 10 also includes a navigation system 28 configured to provide location information in the form of GPS coordinates (longitude, latitude, and altitude/elevation) to a controller 22. In some embodiments, the navigation system 28 may be a Global Navigation Satellite System (GNSS) configured to communicate with global navigation satellites to provide autonomous geo-spatial positioning of the vehicle 10. In the illustrated embodiment, the navigation system 28 includes an antenna electrically connected to a receiver.

With further reference to FIG. 1, the vehicle 10 also includes a plurality of sensors 26 configured to measure and capture data on one or more vehicle characteristics, including but not limited to vehicle speed, vehicle heading, steering wheel angle, and vehicle lateral acceleration. In the illustrated embodiment, the sensors 26 include, but are not limited to, an accelerometer, a speed sensor, a heading sensor, gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, light level detection sensors, and/or additional sensors as appropriate. In some embodiments, the vehicle 10 also includes a plurality of actuators 30 configured to receive control commands to control steering, shifting, throttle, braking or other aspects of the vehicle 10 to reduce a lateral oscillation of the vehicle 10.

In some embodiments, the vehicle 10 also includes an inertial measurement unit (IMU) 25. The IMU 25 is configured to measure linear and/or lateral acceleration of the vehicle 10 using one or more accelerometers and rotation rate of the vehicle 10 in the roll, pitch, and yaw directions using one or more gyroscopes.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle. The controller 22 is in electronic communication, either via a wired or wireless connection, with the IMU 25, the plurality of sensors 26, and the plurality of actuators 30.

In accordance with various embodiments, controller 22 implements an autonomous driving system (ADS) 24 as shown in FIG. 1. That is, suitable software and/or hardware components of controller 22 (e.g., a processor and a computer-readable storage device) are utilized to provide an autonomous driving system 24 that is used in conjunction with vehicle 10. The autonomous driving system 24 processes the data received from the IMU 25 and the plurality of sensors 26 to generate control signals transmitted to the plurality of actuators 30 to control the vehicle 10.

Figure 2:
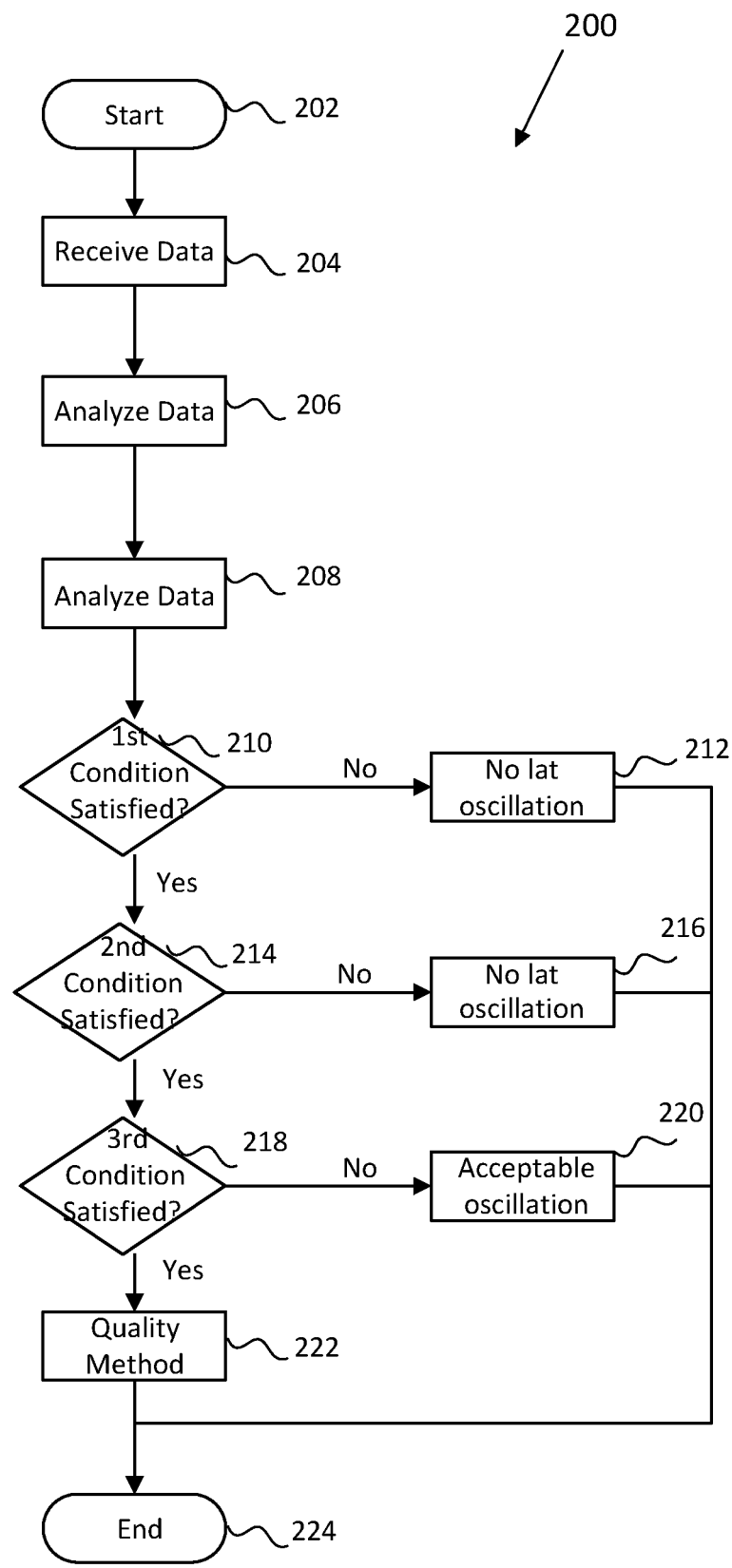
FIG. 2 is a block diagram of a method for detecting lateral oscillations of a vehicle, according to an embodiment.

FIG. 2 illustrates a method 200 to detect lateral oscillations of a vehicle, such as the vehicle 10 illustrated in FIG. 1. The method 200 can be utilized in connection with the controller 22, IMU 25, and one or more sensors 26 as discussed herein, or by other systems associated with or separate from the vehicle, in accordance with exemplary embodiments. The order of operation of the method 200 is not limited to the sequential execution as illustrated in FIG. 2, but may be performed in one or more varying orders, or steps may be performed simultaneously, as applicable in accordance with the present disclosure.

The method 200 begins at 202 and proceeds to 204, wherein the controller 22 receives data from one or more sensors 26 and/or the IMU 25 regarding vehicle characteristics including, for example and without limitation, a vehicle yaw rate and a vehicle lateral acceleration. In some embodiments, the controller 22 also receives sensor data regarding the steering wheel angle (SWA), vehicle speed, brake application rate and frequency, longitudinal acceleration, and a towing condition, for example and without limitation.

Next, at 206, the controller 22 analyzes the yaw rate and lateral acceleration data. In some embodiments, the analysis includes applying a Fourier Transform (FT) algorithm to the yaw rate, lateral acceleration, and the steering wheel angle data to generate signal energy distributions for each data signal in the frequency domain. Examples of signal energy distributions for steering wheel angle (SWA), vehicle yaw rate, and vehicle lateral acceleration are shown in FIG. 3. The controller 22 analyzes the transformed data signals to calculate an amplitude and phase of each of the yaw rate and the lateral acceleration data signals at predetermined frequencies. In some embodiments, these frequencies are approximately 0.4 Hz, 0.6 Hz, 0.8 Hz, 1.0 Hz, 1.2 Hz, and 1.4 Hz. In other embodiments, other predetermined frequencies are analyzed. In some embodiments, to improve computational efficiency and reduce the memory and computation loads on the controller 22, a Fast Fourier Transform (FFT) algorithm such as, for example and without limitation, the Goertzel algorithm or the sliding Goertzel algorithm, is applied to the yaw rate and lateral acceleration data.

The method 200 proceeds to 208 and the controller 22 analyzes the signal energy distributions and calculates the maximum amplitude and associated frequency and phase of any spikes observed in the yaw rate and lateral acceleration signal energy distributions. As shown in FIG. 3, a spike is observed in the signal energy distributions for steering wheel angle (SWA), vehicle yaw rate, and vehicle lateral acceleration at approximately 1.0 Hz. One or more spikes in the signal energy distributions may be detected using any method known to those skilled in the art, including, for example and without limitation, calculating the crest factor of the amplitude of the signal at predetermined frequencies. A spike is detected if the crest factor is larger than a predetermined threshold. At 210, the controller 22 determines whether to conduct further analysis of the yaw rate and lateral acceleration signal energy distributions based on whether a first condition is satisfied, such as, for example and without limitation, a spike was detected in both of the yaw rate and lateral acceleration signal energy distributions at approximately the same predetermined frequency. If the first condition is not satisfied, that is, for example, spikes are not detected in both of the yaw rate and lateral acceleration signal energy distributions at the same approximate frequency, the method 200 proceeds to 212. At 212, the controller 22 determines that lateral oscillation of the vehicle 10 was not detected and the method 200 proceeds to 224 and ends.

However, if the first condition is satisfied, that is, for example, spikes are detected in both of the yaw rate and lateral acceleration signal energy distributions at the same approximately frequency, the method 200 proceeds to 214. At 214, the controller 22 determines whether a second condition is satisfied. In some embodiments, the second condition is whether the maximum amplitude of the spike in the lateral acceleration signal energy distribution is greater than a predetermined lateral acceleration threshold and the maximum amplitude of the spike in the yaw rate signal energy distribution is greater than a predetermined yaw rate threshold. Each of the thresholds is tunable limit and may be determined based on one or more criteria such as the vehicle type, vehicle speed, and vehicle operating condition, among other factors.

If the second condition is not satisfied, that is, the maximum amplitudes of the spikes in the lateral acceleration and yaw rate signal energy distributions are not greater than the predetermined lateral acceleration threshold and the predetermined yaw rate threshold, the method 200 proceeds to 216. At 216, the controller 22 determines that lateral oscillation of the vehicle 10 was not detected and the method 200 proceeds to 224 and ends.

However, if the second condition is satisfied, that is, for example, the maximum amplitudes of the spikes in the lateral acceleration and yaw rate signal energy distributions are greater than the predetermined lateral acceleration threshold and the predetermined yaw rate threshold, the method 200 proceeds to 218.

At 218, the controller 22 determines whether a third condition is satisfied. In some embodiments, the third condition is whether a phase shift between the yaw rate and the lateral acceleration is greater than a predetermined phase shift threshold or within a predefined range or a combination of several predefined ranges for specified boundary conditions including vehicle operating conditions and environmental conditions. FIGS. 4 and 5 illustrate a phase lag or shift between vehicle yaw rate and lateral acceleration. In some embodiments, the specified boundary conditions include vehicle speed, longitudinal acceleration, brake switch, and road camber, for example and without limitation. If the third condition is not satisfied, that is, the phase shift is not greater than the predetermined phase shift threshold, the method 200 proceeds to 220.

At 220, the controller 22 determines that lateral oscillation of the vehicle 10 was detected but that lateral control of the vehicle 10 is acceptable, as determined from analysis of the boundary conditions. FIG. 5 illustrates an acceptable phase shift between the yaw rate and the lateral acceleration of the vehicle indicating acceptable lateral control of the vehicle. As a result, the controller 22 does not incorporate the lateral oscillation data into refinements of other vehicle operating calculations. The method 200 proceeds to 224 and ends.

However, if the third condition is satisfied, that is, for example, the phase shift is greater than the predetermined phase shift threshold for specified vehicle boundary conditions, the method 200 proceeds to 222. FIG. 4 illustrates an unacceptable phase shift between the yaw rate and the lateral acceleration of the vehicle indicating poor lateral control of the vehicle. At 222, a quality method, such as determining whether a subset x samples of y total samples satisfy the specified criteria in a predetermined rolling window of time, is used to confirm that the vehicle is undergoing lateral oscillations that may result in poor or undesirable vehicle lateral movement. In some embodiments, the specified criteria are dependent on one or more of vehicle configuration, vehicle loading, vehicle speed, the vehicle's path of travel, etc., for example and without limitation. In some embodiments, if sixty (60) of one hundred (100) total samples satisfy the specified criteria, the vehicle is undergoing undesirable lateral oscillations. In some embodiments, the quality method is performed at each of the determination steps 210, 214, 218 above, or is performed simultaneously by the controller 22.

At 222, the controller 22 has determined that spikes are detected in both of the yaw rate and lateral acceleration signal energy distributions at the same approximately frequency, the maximum amplitudes of the spikes in the lateral acceleration and yaw rate signal energy distributions are greater than the predetermined lateral acceleration threshold and the predetermined yaw rate threshold, and the phase shift is greater than the predetermined phase shift threshold for specified vehicle boundary conditions and as a result, the controller 22 determines that the data indicates that lateral oscillation of the vehicle 10 was detected. The detection of lateral oscillation indicates poor lateral control of the vehicle 10. This data may be used to refine other vehicle operating calculations performed by the controller 22, the ADS 24, or any other controller of the vehicle 10 to improve or refine control of various aspects of the vehicle 10, including autonomous or semi-autonomous vehicle operation, such as, for example and without limitation, vehicle speed, vehicle heading, etc. From 222, the method 200 proceeds to 224 and ends.

Each of the thresholds discussed herein is a tunable limit and may be determined based on one or more criteria such as the vehicle type, vehicle configuration, vehicle speed, and vehicle operating condition, among other factors, for example and without limitation.

While the method 200 is discussed in reference to comparison of a pair of signals, vehicle yaw rate and vehicle lateral acceleration, in other embodiments, other signal pairs are used to calculate the energy distribution, detection of a spike, and determination of a phase shift. In some embodiments, steering wheel angle (SWA) and yaw rate are compared and in some embodiments, steering wheel angle (SWA) and lateral acceleration are compared.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for detecting a lateral oscillation of a vehicle having a vehicle control system, the method comprising:
   providing the vehicle control system, wherein the vehicle control system includes a first sensor configured to measure a yaw rate of the vehicle, a second sensor configured to measure a lateral acceleration of the vehicle, an actuator configured to control a vehicle operating condition, and a controller electronically connected to the first and second sensors and the actuator;
   monitoring, by the controller, yaw rate data received from the first sensor and lateral acceleration data received from the second sensor;
   analyzing, by the controller, the yaw rate and lateral acceleration data to generate a yaw rate signal energy distribution and a lateral acceleration signal energy distribution, wherein analyzing the yaw rate and lateral acceleration data comprises applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies;
   determining, by the controller, whether a first condition is satisfied;
   if the first condition is satisfied, determining, by the controller, whether a second condition is satisfied;
   if both of the first and second conditions are satisfied, determining, by the controller, whether a third condition is satisfied; and
   if the third condition is satisfied, automatically controlling, by the controller, the actuator to reduce the lateral oscillation of the vehicle.

2. The method of claim 1, wherein the first and second sensors are components of an inertial measurement unit of the vehicle.

3. The method of claim 1, wherein the controller includes an automated driving system to control the vehicle via the actuator.

4. The method of claim 1, wherein analyzing the yaw rate and lateral acceleration signal energy distributions at the plurality of predetermined frequencies comprises calculating an amplitude and phase of the yaw rate signal energy distribution at each of the plurality of predetermined frequencies and calculating an amplitude and phase of the lateral acceleration signal energy distribution at each of the plurality of predetermined frequencies.

5. The method of claim 4, wherein the first condition is whether a first spike is present in the yaw rate signal energy distribution at a first predetermined frequency and a second spike is present in the lateral acceleration signal energy distribution at the first predetermined frequency.

6. The method of claim 5, wherein the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold.

7. The method of claim 6, wherein the third condition is whether a phase shift between the yaw rate signal energy distribution and the lateral acceleration signal energy distribution is greater than a third predetermined threshold.

8. The method of claim 1, wherein automatically controlling the actuator to reduce the lateral oscillation of the vehicle comprises generating a control signal to control one or more of a steering, shifting, throttle, and braking operation of the vehicle.

9. An automotive vehicle, comprising:
   a vehicle control system, the vehicle control system comprising a first sensor configured to measure a yaw rate of the vehicle, a second sensor configured to measure a lateral acceleration of the vehicle, an actuator configured to control a vehicle operating condition; and
   a controller electronically connected to the first and second sensors and the actuator, the controller configured to
      monitor yaw rate data received from the first sensor and lateral acceleration data received from the second sensor;
      analyze the yaw rate and lateral acceleration data to generate a yaw rate signal energy distribution and a lateral acceleration signal energy distribution;
      determine whether a first condition is satisfied;
      if the first condition is satisfied, determine whether a second condition is satisfied;
      if both of the first and second conditions are satisfied, determine whether a third condition is satisfied; and
      if the third condition is satisfied, automatically control the actuator to reduce a lateral oscillation of the vehicle;
   wherein the first condition is whether a first spike is present in the yaw rate signal energy distribution at a first frequency and a second spike is present in the lateral acceleration signal energy distribution at the first frequency, the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold, and the third condition is whether a phase shift between the yaw rate signal energy distribution and the lateral acceleration signal energy distribution is greater than a third predetermined threshold.

10. The automotive vehicle of claim 9, wherein analyzing the yaw rate and lateral acceleration data comprises applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies.

11. The automotive vehicle of claim 10, wherein analyzing the yaw rate and lateral acceleration signal energy distributions at the plurality of predetermined frequencies comprises calculating an amplitude and phase of the yaw rate signal energy distribution at each of the plurality of predetermined frequencies and calculating an amplitude and phase of the lateral acceleration signal energy distribution at each of the plurality of predetermined frequencies.

12. The automotive vehicle of claim 9 further comprising an inertial measurement unit electronically connected to the controller and the first and second sensors are components of the inertial measurement unit of the vehicle.

13. The automotive vehicle of claim 9, wherein automatically controlling the actuator to reduce the lateral oscillation of the vehicle comprises generating a control signal to control one or more of a steering, shifting, throttle, and braking operation of the automotive vehicle.

14. A system for controlling a vehicle, comprising:
a first sensor configured to measure a yaw rate of the vehicle;
a second sensor configured to measure a lateral acceleration of the vehicle;
an actuator configured to control a vehicle operating condition; and
a controller electronically connected to the first and second sensors and the actuator, the controller configured to
monitor yaw rate data received from the first sensor and lateral acceleration data received from the second sensor;
analyze the yaw rate and lateral acceleration data to generate a yaw rate signal energy distribution and a lateral acceleration signal energy distribution;
determine whether a first condition is satisfied;
if the first condition is satisfied, determine whether a second condition is satisfied;
if both of the first and second conditions are satisfied, determine whether a third condition is satisfied; and
if the third condition is satisfied, automatically control the actuator to reduce the lateral oscillation of the vehicle;
wherein the first condition is whether a first spike is present in the yaw rate signal energy distribution at a first frequency and a second spike is present in the lateral acceleration signal energy distribution at the first frequency, the second condition is whether a maximum amplitude of the first spike in the yaw rate signal energy distribution is greater than a first predetermined threshold and a maximum amplitude of the second spike in the lateral acceleration signal energy distribution is greater than a second predetermined threshold, and the third condition is whether a phase shift between the yaw rate signal energy distribution and the lateral acceleration signal energy distribution is greater than a third predetermined threshold.

15. The system of claim 14, wherein analyzing the yaw rate and lateral acceleration data comprises applying a Fourier transform to the yaw rate data to generate the yaw rate signal energy distribution, applying a Fourier transform to the lateral acceleration data to generate the lateral acceleration signal energy distribution, and analyzing the yaw rate and lateral acceleration signal energy distributions at a plurality of predetermined frequencies.

16. The system of claim 15, wherein analyzing the yaw rate and lateral acceleration signal energy distributions at the plurality of predetermined frequencies comprises calculating an amplitude and phase of the yaw rate signal energy distribution at each of the plurality of predetermined frequencies and calculating an amplitude and phase of the lateral acceleration signal energy distribution at each of the plurality of predetermined frequencies.

17. The system of claim 14, wherein automatically controlling the actuator to reduce the lateral oscillation of the vehicle comprises generating a control signal to control one or more of a steering, shifting, throttle, and braking operation of the vehicle.

* * * * *